Jan. 10, 1939.  L. H. MORIN  2,143,790
ELECTRICALLY OPERATED VENDING MACHINE
Filed Jan. 8, 1936  7 Sheets-Sheet 1

Inventor
Louis H. Morin
By Browne&Phelps
Attorneys

Jan. 10, 1939. L. H. MORIN 2,143,790
ELECTRICALLY OPERATED VENDING MACHINE
Filed Jan. 8, 1936 7 Sheets-Sheet 2
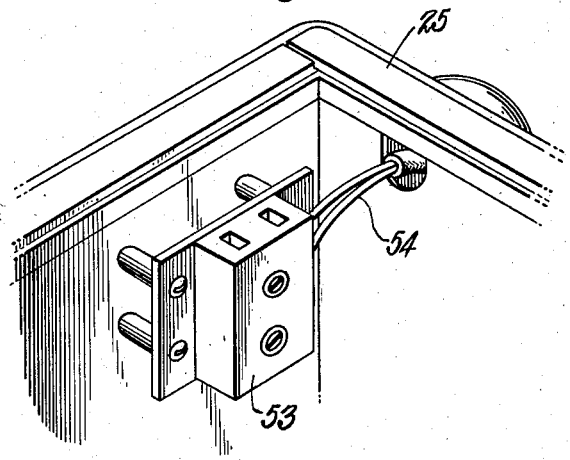
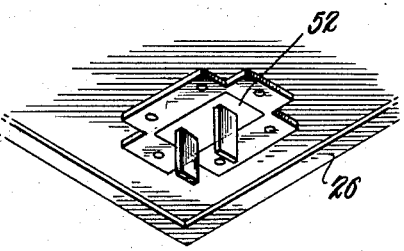
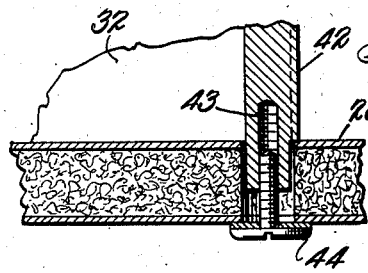
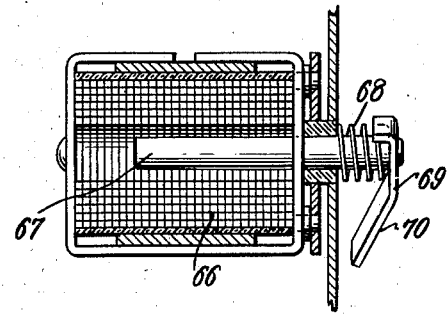
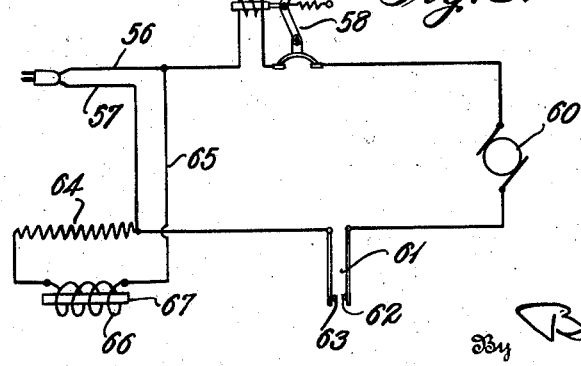
Inventor
Louis H. Morin
By Browne Phelps
Attorneys Jan. 10, 1939. L. H. MORIN 2,143,790
ELECTRICALLY OPERATED VENDING MACHINE
Filed Jan. 8, 1936 7 Sheets-Sheet 3

Inventor
Louis H. Morin
By Browne + Phelps
Attorneys

Jan. 10, 1939.  L. H. MORIN  2,143,790

ELECTRICALLY OPERATED VENDING MACHINE

Filed Jan. 8, 1936  7 Sheets-Sheet 4

Inventor
Louis H. Morin
By Browne & Phelps
Attorneys

Jan. 10, 1939. L. H. MORIN 2,143,790
ELECTRICALLY OPERATED VENDING MACHINE
Filed Jan. 8, 1936 7 Sheets-Sheet 6

Inventor
Louis H. Morin
By
Attorneys

Jan. 10, 1939.　　　L. H. MORIN　　　2,143,790
ELECTRICALLY OPERATED VENDING MACHINE
Filed Jan. 8, 1936　　　7 Sheets-Sheet 7
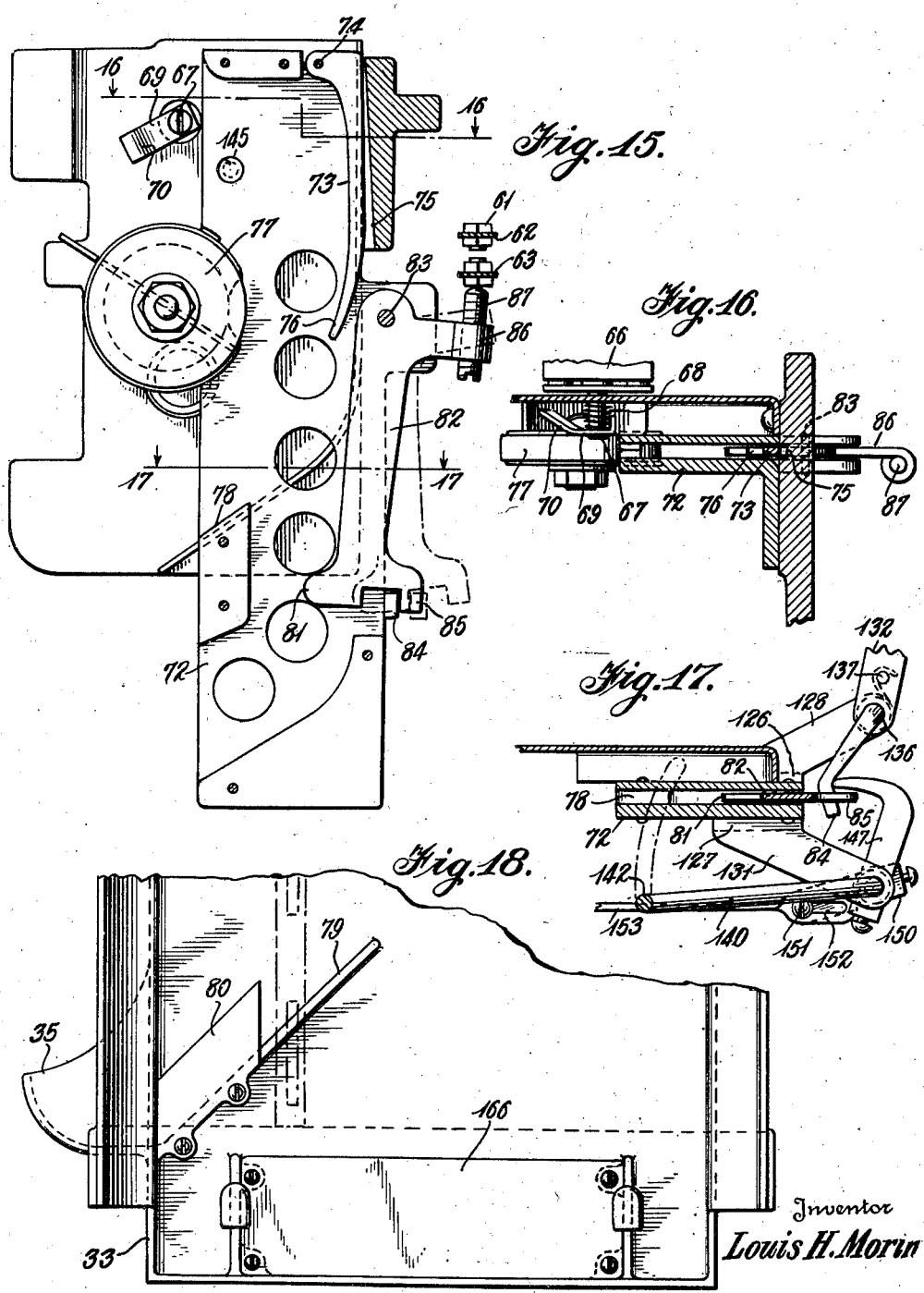
Inventor
Louis H. Morin
By Browne & Phelps
Attorneys Patented Jan. 10, 1939

2,143,790

UNITED STATES PATENT OFFICE 2,143,790

ELECTRICALLY OPERATED VENDING MACHINE

Louis H. Morin, New York, N. Y., assignor to Coca-Cola Company, Atlanta, Ga., a corporation of Delaware Application January 8, 1936, Serial No. 58,206

6 Claims. (Cl. 194—10)

This invention relates to electrically operated vending machines and is primarily adapted to that class of such machines which are used to vend precooled bottled beverages.

Since the potable temperature of a bottled beverage is a prime factor, the present invention contemplates a vending machine which will not accept a coin should either the cooling device or operating mechanism become inoperative through failure of the electric current.

The primary object of the invention is to provide a machine which shall be efficient in operation, means being incorporated therein to reject and return improper coins or tokens, but operating quickly to deliver a cooled bottle, upon insertion of a proper coin without the necessity of further effort on the part of a customer, beyond the actual removal of the vended article.

The accompanying drawings illustrate a preferred embodiment of such a machine, in which Figure 1 is a perspective view partly broken away to show interior construction.

Figure 4 is a detail perspective view of electrical connections.

Figure 5 is a detail perspective view of electrical connections.

Figure 6 is a detail view of securing means between the casing and cabinet.

Figure 7 is a section of the solenoid.

Figure 8 is a wiring diagram.

Figure 15 is a detail section of the coin chute and switch.

Figure 16 is a section on line 16—16 of Figure 15.

Figure 17 is a section showing the means for closing the coin chute to render the operating mechanism inoperative, and Figure 18 is a detail showing the coin return and coin retaining means.

Figure 1:
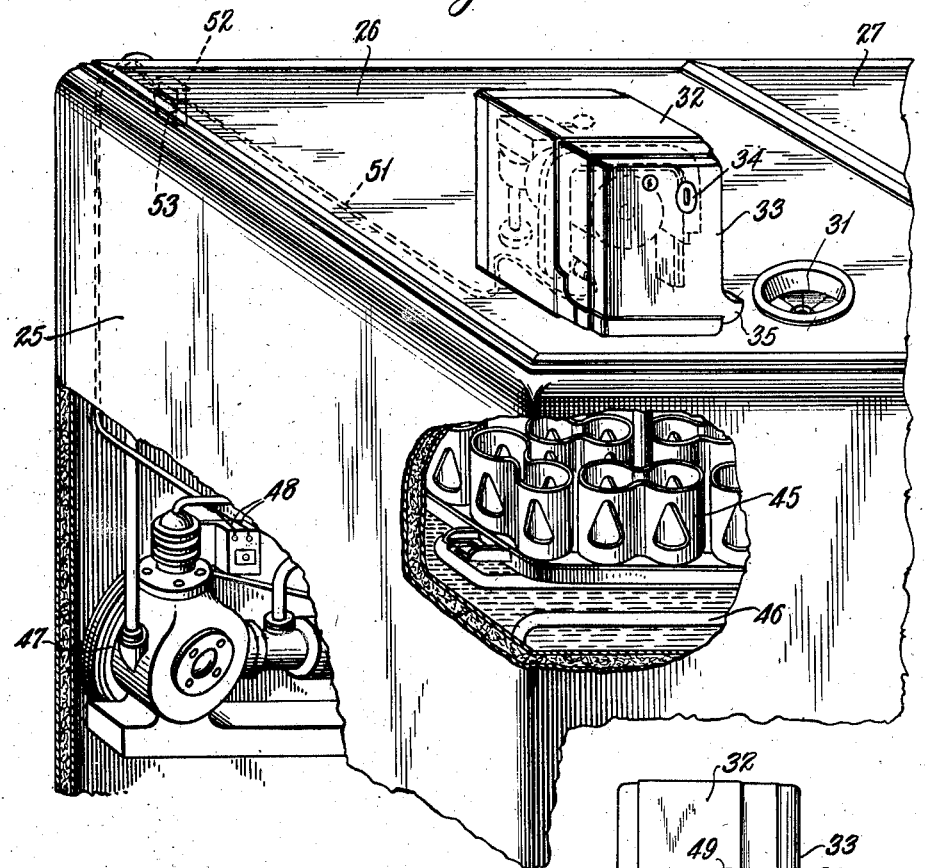
Figure 2:
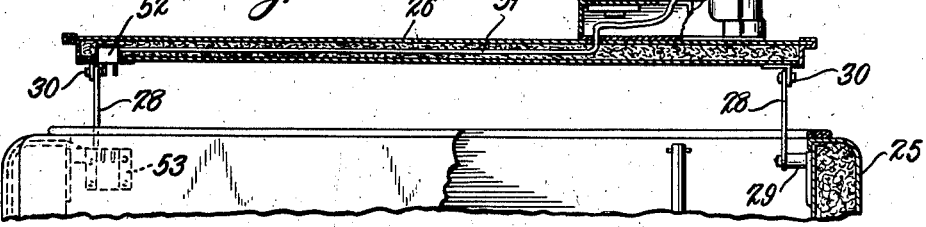
Figure 2 is a side view partly in section showing electrical connections.
Figure 3:
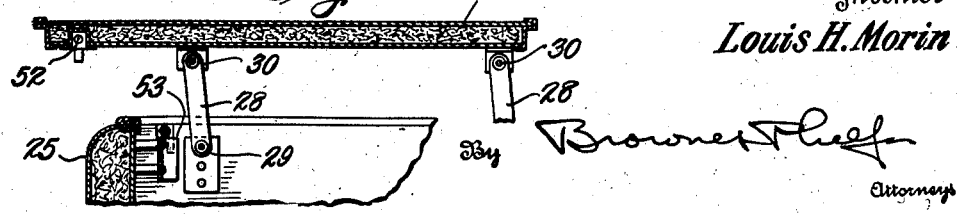
Figure 3 is a detail view of the make and break connection for the cover.

The machine comprises a suitably insulated cabinet 25 having two covers 26 and 27 giving access to the cabinet interior. The cover 27 may be removable bodily from the cabinet, but the cover 26 is mounted upon links 28 pivotally mounted on brackets 29 on the interior wall of the cabinet 25 and bracket 30 carried by the cover 26 on its under face. By this construction, the cover 26 can be raised with a vertical and horizontal movement, as shown in Figures 2 and 3, exposing that portion of the interior of the cabinet 25 normally closed by such cover 26. A discharge opening 31, for the articles being vended, is in cover 26.

Figure 11:
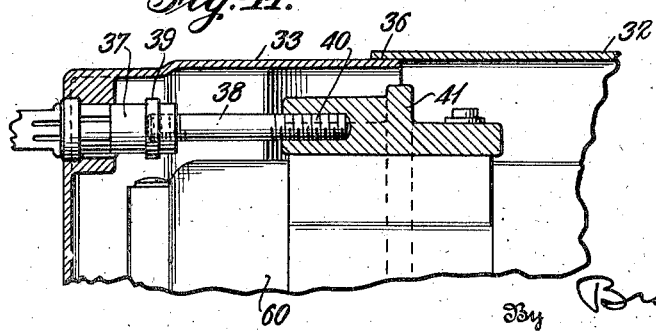
Figure 11 is a detail section of the housing cover fastening means.
Figure 12:
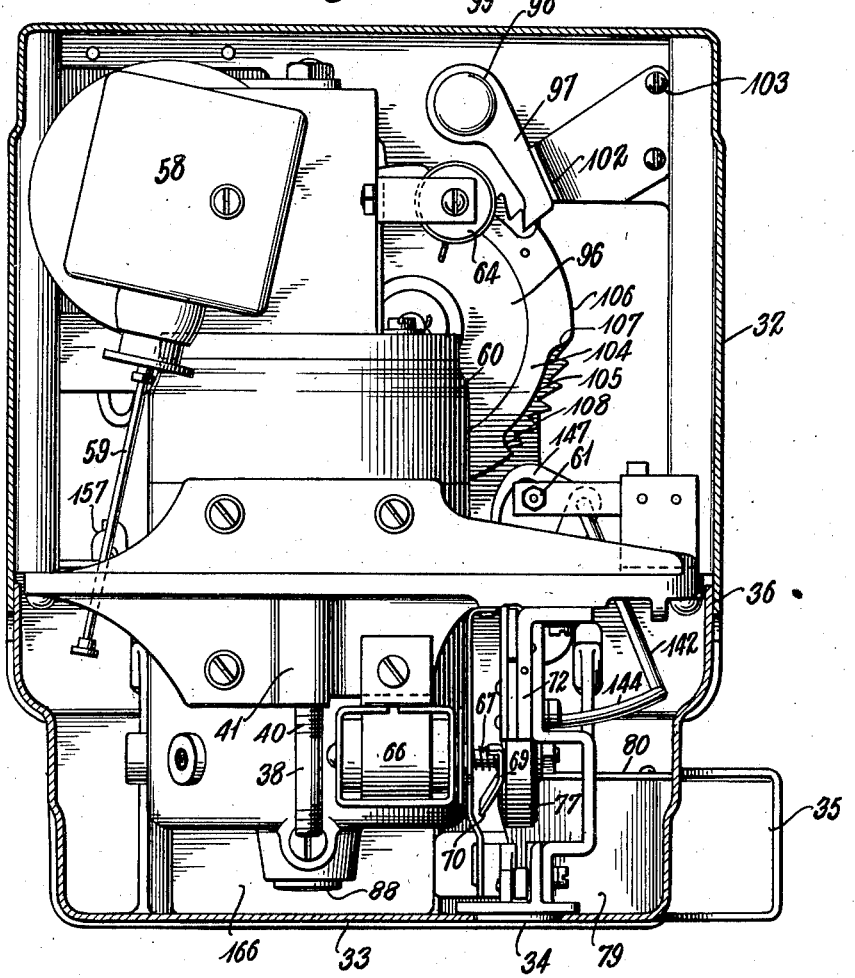
Figure 12 is a top plan view of the operating mechanism with the housing in section.

The cover 26 carries the operating mechanism, to be hereafter described, which is housed within a casing 32, having a removable front portion 33 through which projects the coin slot 34. The front 33 has formed integral therewith the coin return cup 35. As shown in Figure 11 the front 33 telescopes slightly into the casing 32 as at 36 and is removably locked in such position by a lock 37 releasably engaging a pin 38 carried by the member 39 threaded at 40 for rigid support by the bracket 41 within the casing 32. The casing 32, as shown in detail in Figure 6, is supported upon the cover 26 by legs 42, interiorly threaded at 43 for engagement by headed screws 44.

Within the cabinet 25 there is a conveyor 45 adapted for horizontal movement to bring articles to be vended in alinement with the discharge opening 31. The conveyor construction is shown in my co-pending applications Serial No. 743,255, filed September 4, 1934, and Serial No. 25,336, filed June 6, 1935, and forms no part of my present invention except insofar as it cooperates therwith. In the present construction of vending machine, it is intended to dispense with the ejector mechanism of my prior applications, the present construction being adapted to simply bring a bottle underneath the discharge opening in a position where it can be removed by the customer.

The cabinet is filled with water to a proper level and is cooled by means of a coil 46 which is a portion of an electrically operated mechanical refrigeration unit, conventionally illustrated at 47, with its source of electric current being the wires 48 which may draw current from a wall plug not shown.

Within the casing 33 is mounted the female portion 49 of a two part electric plug, the removable or male member being shown at 50. From the part 50 wires 51 pass into the interior of cover 26 and are connected to a plug member 52 the prongs of which are adapted to enter the socket member 53 on the interior wall of the cabinet 25. The socket member 53 is suitably wired as at 54 for connection with a source of electric current, usually the wall plug above referred to. By this construction the cover 26 may be raised to give access to the interior of the cabinet 25, breaking the circuit by disengagement of the parts 52 and 53, such parts reengaging upon the closing of the cover 26.

From the socket 49 extend wires 56, 57 connected in series with a thermal overload cut out, 58 having a manually operable reset means 59, a universal motor 60, a coin operated switch 61 with contact points 62 and 63 and a series resistor 64. By means of an extension wire 65 from wire 56 a solenoid 66 having a core member 67 in the form of a rod, is in said circuit, but not under control of switch 61, the purpose of this arrangement being to keep solenoid 66 energized at all times the machine is connected to a source of current as hereinafter described. With the current on the core 67 is normally retracted against the action of a coil spring 68. Core 67 carries a member 69 at its outer extremity, such member being bent at 70.

Rearwardly of the coin slot 34 and designated by the numeral 71 is the mechanism of my prior Patent No. 1,945,948 dated February 6, 1934, Protecting means for coin controlled apparatus. This mechanism in addition to protecting the machine against the insertion of foreign matter and bogus coins, provides means for impelling proper coins from the slot 34 inwardly to the coin shute 72. The inward impulse given to an entering coin by the mechanism 71 is such that a buffer for the coin is necessary. This buffer constitutes a member 73 pivoted at 74 to permit slight rearward movement until stopped by member 75 after the incoming coin has struck against the member 73. Buffer 73 is slightly curved at its lower end, as at 76, to form a temporary support for an incoming coin which has been momentarily halted by striking the buffer 73.

A permanent magnet 77 projects into the coin chute 72. Should a bogus coin or check pass the mechanism 71 it will be, during its momentary contact with buffer 73, attracted by such magnet 77, diverting the fall of such coin away from the vertical to cause it to travel along the incline 78 which is alined with incline 79 on the interior of the front portion 33 of the casing 32. Incline 79 is formed with side walls 80 throughout a portion of its length which guide the rejected coin into the coin return 35.

A proper coin or check is unaffected by the magnet 77 and drops vertically into engagement with toe 81 of lever 82 pivoted at 83 to normally assume the position shown in full lines in Figure 15 but limited by the thickness of a member 84 engaged by extension 85. Lever 82 carries an arm 86 in which is adjustably mounted a threaded member 87 of fiber or similar non-conductive material, such member 87 engaging the under side of contact 63 of switch 61. The weight of the coin upon the part 81 moves the lever 82 to the right as shown in dotted lines in Figure 15, closing contacts 62 and 63. This starts motor 60 with consequent rotation of the shaft 88, which through the medium of bevel gears 89, 90, Figure 10, rotates shaft 91 which carries by means of an eccentric 92, the pawl 93 which, under the urge of leaf spring 94 engages the teeth of ratchet 95 upon the periphery of disk 96. To prevent backlash a second pawl 97 is pivotally mounted at 98 upon a stub shaft 99 carried by a journal 100 formed in the casing 32. Shaft 99 is pinned at 101 for removal. Pawl 97 is held in engagement with the teeth 95 by a spring 102 mounted at 103 on the interior wall of casing 32.

Figure 13:
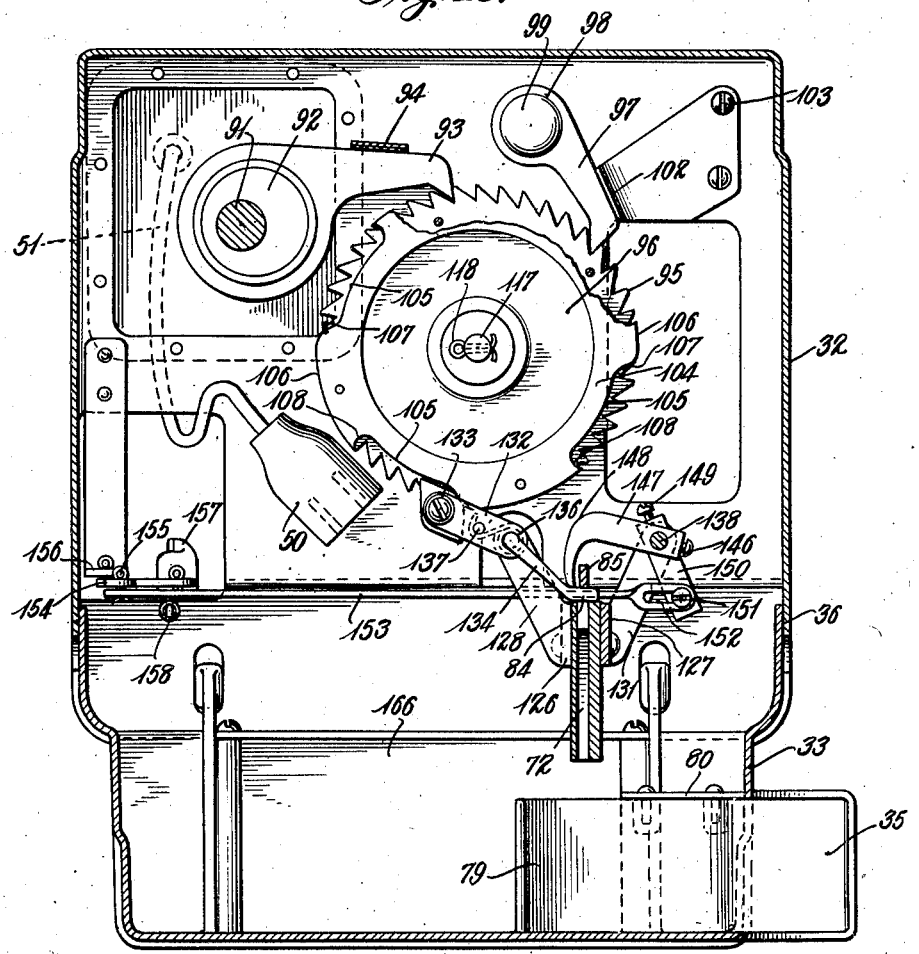
Figure 13 is a section on line 13—13 of Figure 10.

Above the pawls 93 and 97 and mounted adjacent the periphery of the disk 96 is a ring member 104 and having a series of depressions 105 between which lie cam surfaces 106 connecting at one end of each cam with the adjacent depression 105 by an incline 107 and at the other end by an abrupt drop 108. In Figure 13 the ring member 104 is shown partly cut away in order to illustrate the teeth 95 of disk 96, such teeth being located below the member 104. Below the ratchet 95 is a circular boss 109 having a shoulder 110 from which depends a shaft 111 hollow to form a bore as at 112 and terminating in a bifurcated end 113 having slots 114. The shaft 111 is rotatably mounted in a journal 115 having a bearing 116 which cooperates with the shoulder 110. Within the bore 112 is mounted a rod 117 pinned at 118 and having an enlarged head 119 which confines a coil spring 120 exerting a downward pressure against said head 119 to keep the rod 117 at its lowest position but permitting vertical movement of said rod 117 in the bore 112. A cross pin 121 is carried by the head 119 to slide vertically in the slots 114. This shaft end construction is designed for releasable engagement with the drive shaft (not shown) of the conveying mechanism shown in my pending applications above referred to. This releasable engagement is necessary because the raising of cover 26 carries with it the operating mechanism.

Figure 14:
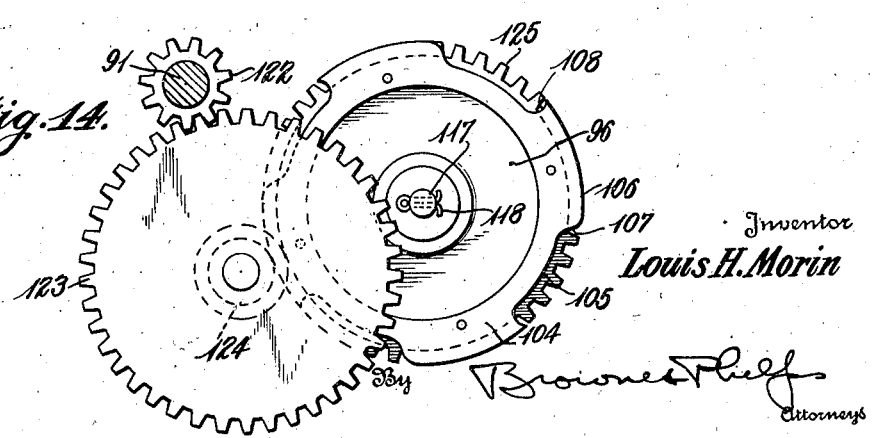
Figure 14 shows a modified form of driving mechanism.

Figure 14 shows a modification of the driving connection between the motor shaft 91 and the disk 96. In this form the pawl 93 and its eccentric mounting is dispensed with and a suitable train of gears 122, 123 and 124 is provided to drive the disk 96, gear teeth 125 being used instead of ratchet 95. This construction is used where quieter operation of the machine is desired, as when installed in offices or the like.

From opposite sides of the coin chute 72 extend brackets 126 and 127. Bracket 126 is provided with ears 128—129 and bracket 127 is similarly formed with ears 130—131, all four of such ears being provided with a central aperture. Pivoted in ears 128—129 on bracket 126 is an arm 132 carrying at one end a roller 133 normally engaging one of the depressions 105 of disk 96, such arm 132 being elongated to form a rigid extension 134 which terminates in the member 84. A spring 135 coiled about pivot 136 and bearing against a pin 137 tends to yieldingly hold roller 133 within one of the depressions 105 and the member 84 in the position shown in full lines in Figure 15.

Mounted to permit rotation within the ears 130—131 of the bracket 127 is a rod 138 which extends upwardly to a point 139 where it is bent to form a horizontal portion 140 and again bent at 141 to provide an upwardly extending vertical portion 142 bent at 143 to form an additional horizontal portion 144 which upon partial rotation of the rod 138, as hereinafter described, may extend into the coin chute 72 through an aperture 145 in the side wall of the mechanism 71. Proper rotation of the rod 138 in the opposite direction will also cause it to be retracted from projection into the coin chute. Fast upon the rod 138, and adjustable with relation thereto through a set screw 146 is mounted an arm 147 having an angular projection 148 engaging the arm 134 at the beginning of the portion 84 of said arm 134.

Figure 9:
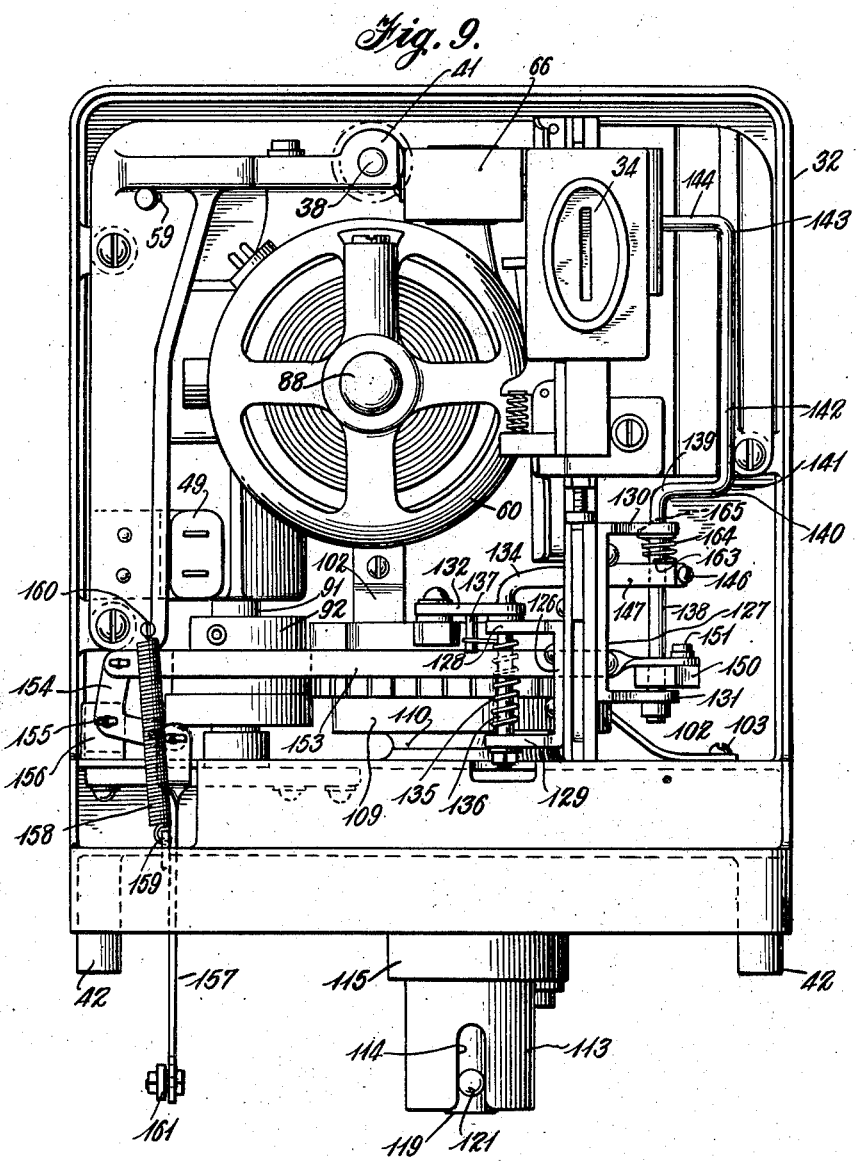
Figure 9 is a front elevation of the operating mechanism.

Also mounted upon the rod 138 and adjustably secured to said rod 138 by means of a set screw 149 is an arm 150 provided at its outer end with a pin 151. Pin 151 engages an eye 152 formed upon a bar 153 which extends across the front of the control mechanism as best shown in Figure 9 where it engages a bell crank 154 pivoted at 155 upon a bracket 156, the opposite end of said bell crank being engaged by a vertically extending member 157. The bell crank 154 and the member 157 are under tension of a spring 158 secured at 159 to the member 157 and at its other end at a suitable point 160 within the casing. The tension of this spring tends to normally keep members 153, 154 and 157 in the position shown best in Figure 9.

Figure 10:
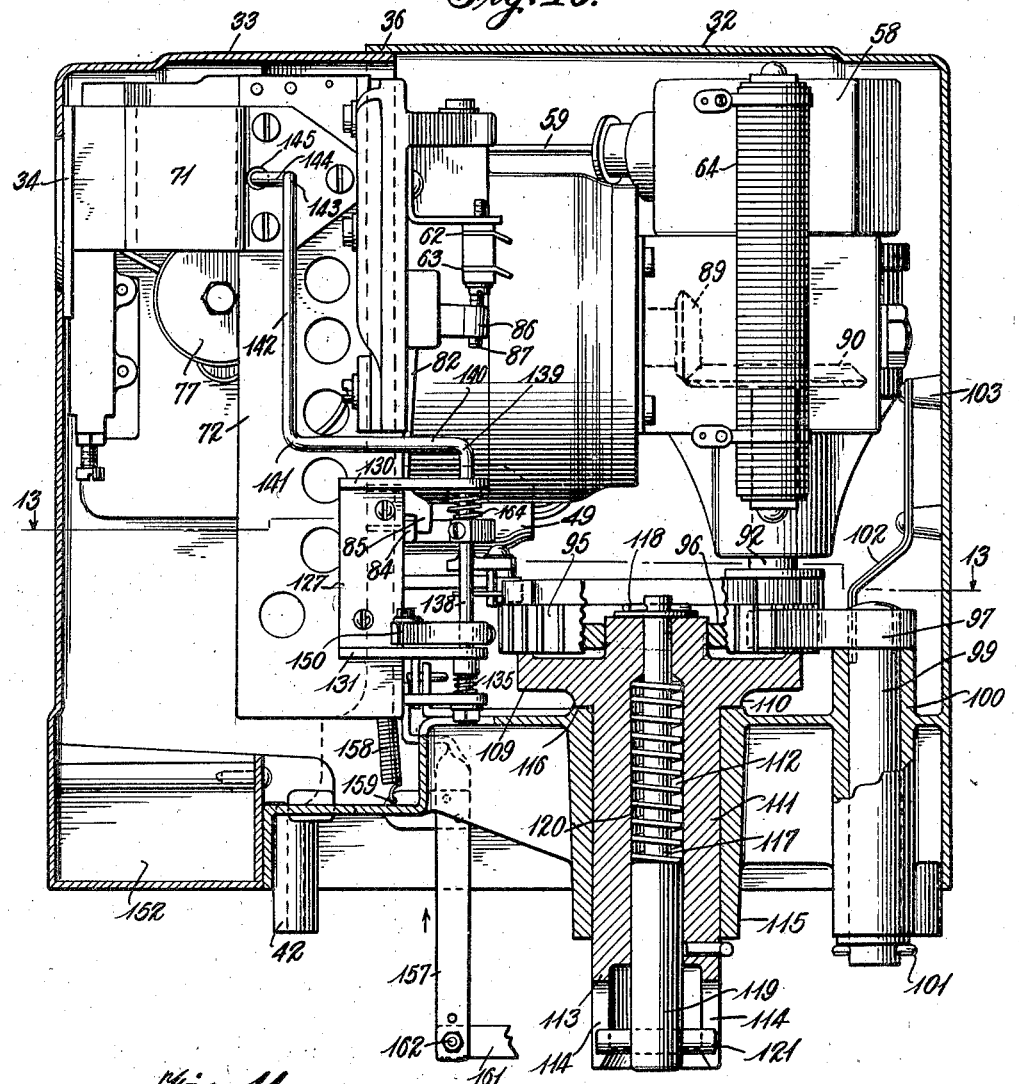
Figure 10 is a side elevation of the operating mechanism with certain parts in section.

As shown in Figure 10 a member 161 is pivoted at 162 to the member 157 and extends horizontally to a point within the cabinet for engagement by the article to be vended. This feature is not illustrated herein, but is shown and described in my co-pending applications above referred to. For the sake of clearness in this application, as long as there are articles to be vended within the cabinet, the member 157 and its cooperating linked members remain in the position shown in Figures 9 and 10. If the machine is empty under the pull of spring 158, member 157 moves upwardly in the direction of the arrows in said figures giving corresponding movement to parts 154 and 153.

On the rod 138 is a pin 163 to which is fastened one end of a coil spring 164, the other end being secured to the bracket 127 as at 165, such spring being coiled about rod 138 in such manner as to cause said rod 138 and the arm 147 to assume the position shown in Figure 13 and to return such parts to such position after the operation shown in Figure 17.

Below the discharge end of the coin chute 72 is a coin-receiving box 166 removable with the front portion 33 of the casing 32.

The operation of the machine is as follows:

A coin or token is inserted in the coin slot 34 and drawn inwardly by the mechanism 71. If the necessary current for the operation of the mechanical refrigeration unit and the operation of the machine mechanism is being supplied to the machine, the solenoid 66 is being energized to retract the core-rod 67 against the action of spring 68 and the coin will pass readily by the member 69. If, on the other hand, the electric current is off, the solenoid 66 is deenergized and rod 67 under the action of spring 68 projects into the coin slot and the member 69 deflects the entering coin or token preventing further rearward movement of said coin and causing it to fall vertically into the coin return 35.

An entering coin or token under normal conditions is projected rearwardly against the buffer 73 where the progress of such coin is momentarily halted within the curved portion 76. Should the coin or token be an improper one it is, at this point attracted by the magnet 77 and drawn thereto where such improper coin rolls downwardly around the outer periphery of such magnet finally dropping into the coin return 35.

If a proper coin has been momentarily halted by the buffer 73 it is not attracted by the magnet 77 but drops downwardly into the coin chute 72 into engagement with the toe 81 of the lever 82, the weight of such coin causing such lever to move slightly toward the right whereby to close contacts 62 and 63 of the control switch to energize the motor 60 causing a rotation of the motor shaft 88 in turn transmitting rotary motion to shaft 91 which in the construction shown in Figure 13 causes oscillation of the cam 92 to cause alternate engagement of the teeth 95 by pawl 93 thus rotating the disk 96 in a clockwise direction.

If the construction of drive is as illustrated in Figure 14 motion is transmitted by shaft 91 to gear 122 and is transmitted therefrom through gears 123 and 124 to the disk 96 by its engaging teeth 125.

Rotation of the disk 96 in a clockwise direction by either drive causes the roller 133 to ride upon the inclined surface 107 until it engages the outer periphery of the raised portion 106 of the ring 104. This travel of roller 133 causes lever 132 to move outwardly upon its pivot 136 causing a corresponding movement of the arm 134 inwardly carrying with it member 84 which in its travel now engages part 85 of the lever 82 causing such lever to move well to the right holding spring contacts 62 and 63 closed and permitting the coin held by toe 81 to drop downwardly into the coin box 166.

At the same time movement of the member 84, being in engagement with the extension of lever 147 causes such lever 147 to move in a clockwise direction and being fast on shaft 138 rotates such shaft to cause consequent entry of the extension 144 thereof into the coin slot 72 through the aperture 145, the pin 151 sliding freely to the left in eye 152. This operation is for the purpose of preventing the insertion of another coin into the machine while a vending operation remains incomplete. The rod 144 effectively blocks entrance to the coin slot 72 and causes an inserted coin to drop into the coin return 35.

During this operation the shaft 117 has been rotating to transmit through the medium of the member 119 and its cross pin 121, motion to the driving shaft of the dispensing conveyor which is located inside of the cabinet and forms no part of this invention.

Continued operation causes further movement of the disk 96 in a clockwise direction until roller 133 reaches point 108 and drops off of the raised portion 106 into the next lower portion 105. In this position lever 132 moves inwardly upon the pivot causing a corresponding outward movement of the arm 134 and the member 84 whereupon the lever 82 by its own weight again assumes the position shown in full lines in Figure 15 opening spring contacts 62 and 63 to cut off current from the motor to complete the vending operation for a single delivery. During the last part of this operation the spring 164 has caused the rod 138 to rotate to withdraw the rod extension 144 from its blocking position in the coin slot entrance. This return movement of the rod 138 to its normal position has caused corresponding movement of the arm 147 so that the parts again assume the position shown in Figure 13, ready for subsequent vending operation.

It will be seen that should current from the source to the wall plug or other connection which supplies wires 48 and 54 be interrupted whereby refrigeration fails, solenoid 66 will be deenergized to prevent the passage of a coin to cause operation of switch 62, 63 and therefore delivery of a bottle, the coin being returned to the customer. Such cessation of current supply at a point exterior of the device is referred to in the appended claims as failure of current for the operation of such cooling means. It is perfectly obvious that wires 48 and 54 may be connected at the device, and in parallel, to a single pair of wires in a cord leading to the wall plug or the like so that this cord will be a portion of the connection for the current supply from the power source.

I claim:

1. In an electrically operated vending machine, in combination: a coin closed switch; electrically driven vending means controlled by said switch; electrically driven means for cooling articles to be vended; said electrically driven means operated by current from a common source; and means to prevent the closing of said switch by a coin upon failure at said source of current for driving said cooling means.

2. In an electrically operated vending machine in combination, a means operable to move articles to a vended position, an operating electric circuit for said means including a coin-controlled switch, an electricaly operable refrigerating means for said articles operatively disposed in a circuit supplied from the same source as the first named circuit, whereby upon failure of current supply to the refrigerating means at said source, the first mentioned means cannot operate to vend articles from the machine.

3. In an electrically operated vending machine in combination, means operable to move articles to a vending position, an operating electric circuit for said means including a coin-controlled switch, an electrically operable refrigerating means for said articles operatively disposed in a circuit supplied from the same source as the first named circuit, whereby upon failure of current supply to the refrigerating means at said source, the first mentioned means cannot operate to vend articles from the machine, and mechanism operable by the first mentioned means to prevent insertion of a coin to operate the switch during a vending operation.

4. In a machine of the class described, structure providing a coin deposit chute, an element movably mounted in said chute coacting with the structure to arrest deposit of each coin and to impart an initial movement to said element, electric circuit means including a normally open switch closable by said element through said movement, and vending mechanism operable by said electric circuit, including a movable member operating during vending to impart further movement to said element to release the arrested coin and to hold said circuit closed.

5. In a machine of the class described, structure providing a coin deposit chute, an element movably mounted in said chute having means coacting with the structure to arrest deposit of each coin and impart an initial movement to said element, electric circuit means including a normally open switch closable by said element through said movement, vending mechanism operable by said electric circuit means including lever means pivoted on said structure and connected with said element and means operated by said vending mechanism to impart further movement to said lever means to immediately release the arrested coin and to hold said switch closed during the vending operation.

6. In a device of the class described: mechanically operated article vending apparatus; an electric motor geared to drive said apparatus; a coin chute; a lever pivoted adjacent said chute and having a portion projecting into said chute; a switch to close the circuit of said motor operated to closed position by engagement of a coin with said portion; and means operated by said geared drive to further move said lever toward switch closing position and to release said coin during initial movement of the vending apparatus.

LOUIS H. MORIN.